United States Patent [19]
Ferguson

[11] 3,709,318
[45] Jan. 9, 1973

[54] AIR CUSHION VEHICLE
[75] Inventor: Hugo S. Ferguson, Averill Pk., N.Y.
[73] Assignee: Air Cushion Vehicles, Inc., Poestenkill, N.Y.
[22] Filed: June 30, 1971
[21] Appl. No.: 158,284

Related U.S. Application Data
[63] Continuation-in-part of Ser. No. 2,810, Jan. 14, 1970, Pat. No. 3,608,662.

[52] U.S. Cl....................................180/116, 180/127
[51] Int. Cl..............................................B60v 1/00
[58] Field of Search.............................180/116, 127

[56] References Cited
UNITED STATES PATENTS

| | | | |
|---|---|---|---|
| 3,185,240 | 5/1965 | Eggington | 180/116 |
| 3,581,667 | 6/1971 | Bertin | 180/116 |
| 3,313,366 | 5/1967 | Dionisio | 180/127 |
| 3,339,655 | 9/1967 | Guienne | 180/127 |

Primary Examiner—Gerald M. Forlenza
Assistant Examiner—D. W. Keen
Attorney—Dean S. Edmonds et al.

[57] ABSTRACT

An air-cushion vehicle has a body structure including a rigid platform, and a shock absorber section of semi-rigid self-supporting resilient material fixedly attached around the periphery of the rigid platform with the lower surface of the shock absorber section extending outwardly and downwardly below the rigid platform. A thin skirt of tough flexible material is united with the shock absorber section and extends downwardly from the peripheral region thereof. The skirt has integral mounting skirt members which are united with the outer peripheral surface and lower surface of the shock absorber section, and the shock absorber section extends beneath the rigid platform in overlapping relationship with the overlapping surfaces inclined outwardly and upwardly from the horizontal. At the front, the lower portion of the shock absorber section slopes upwardly and forwardly. The rigid platform, shock absorber section and skirt comprise a plenum chamber to which air pressure is supplied.

14 Claims, 9 Drawing Figures

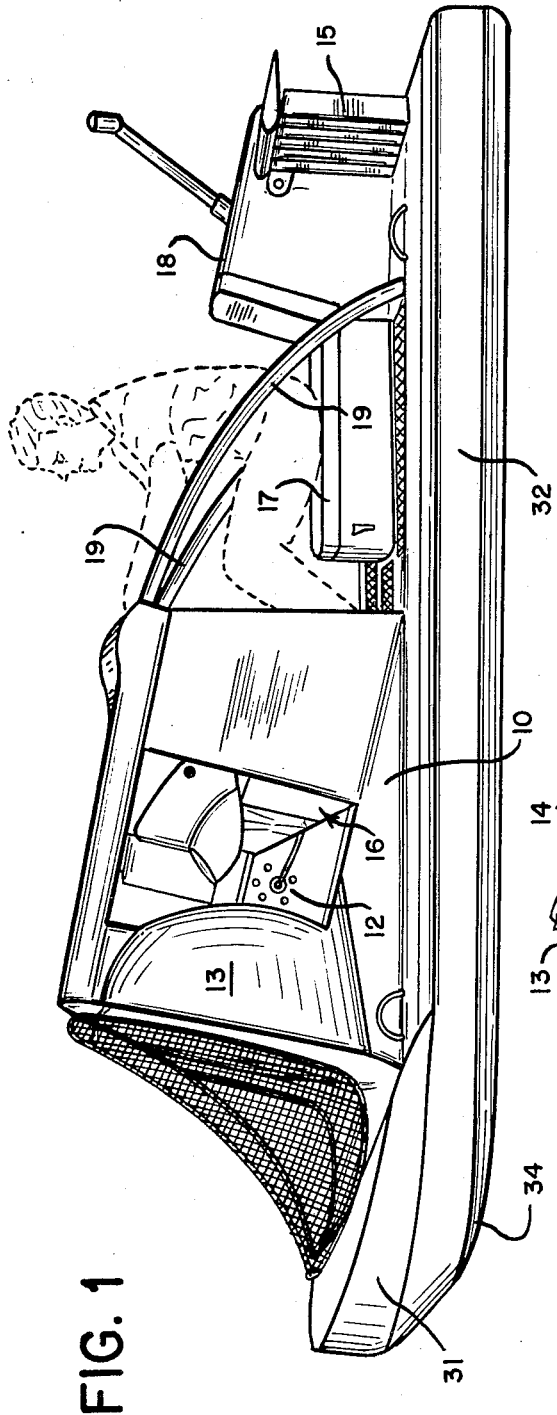
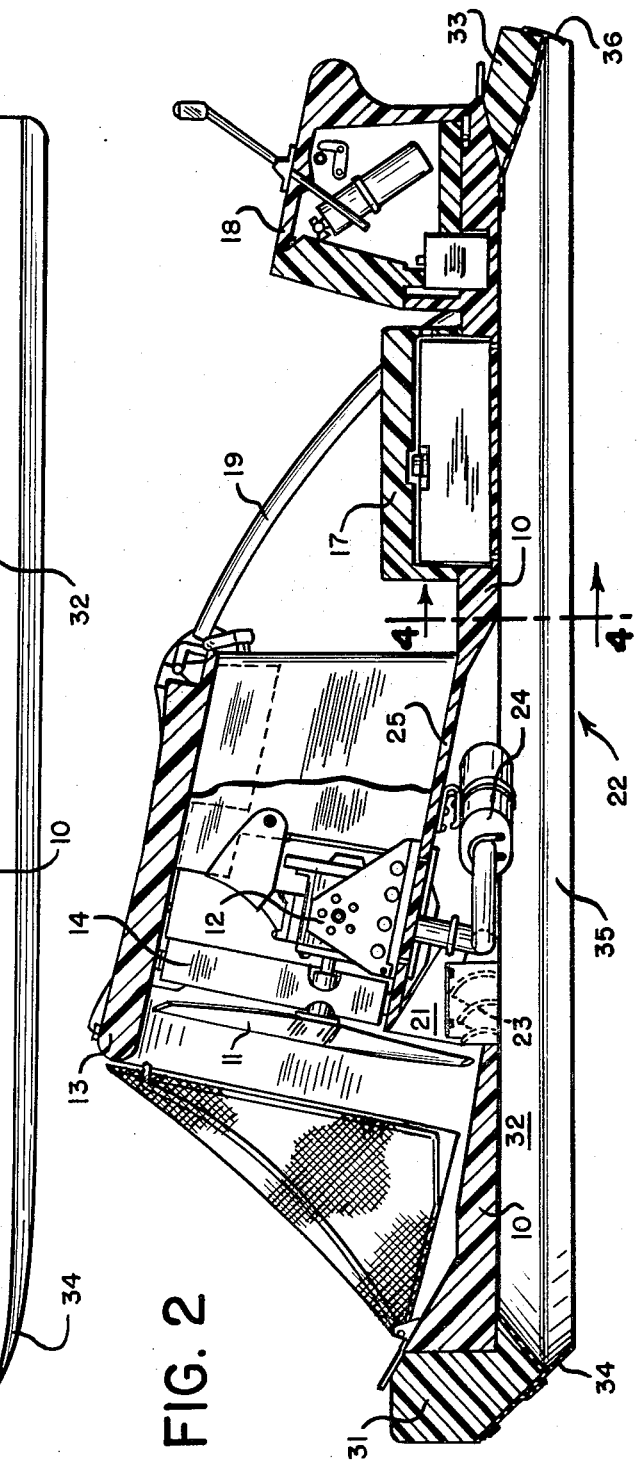

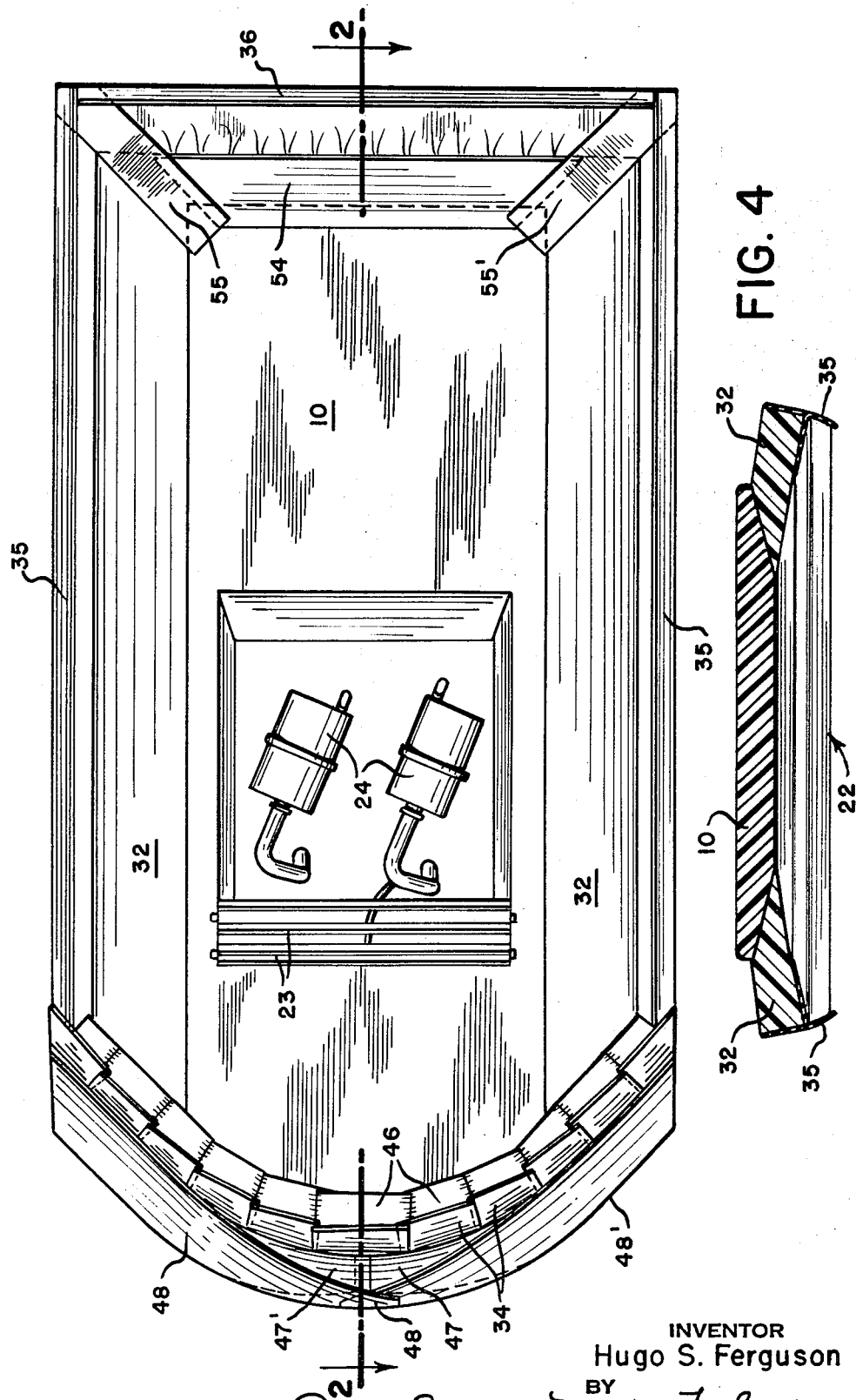

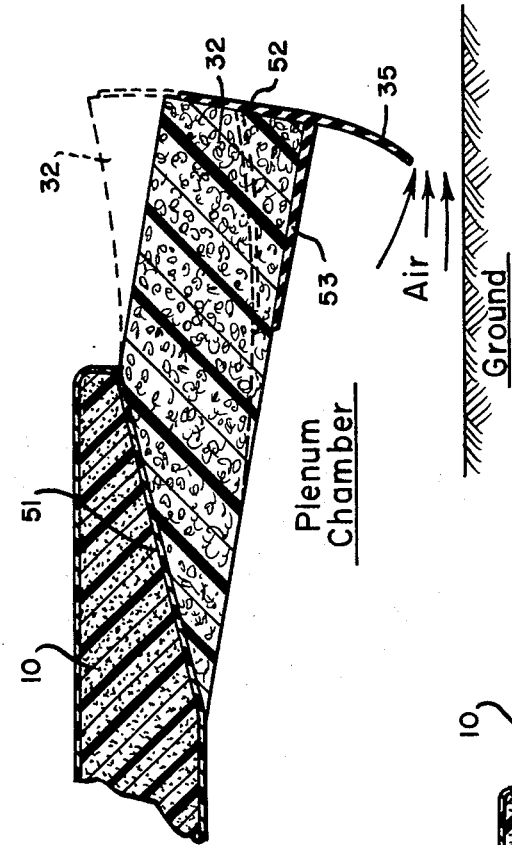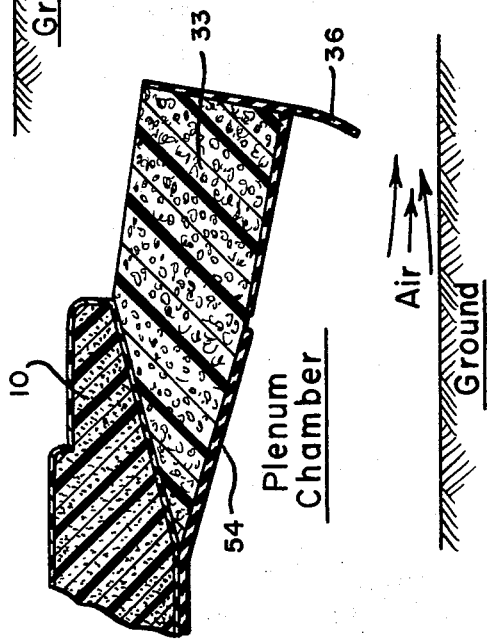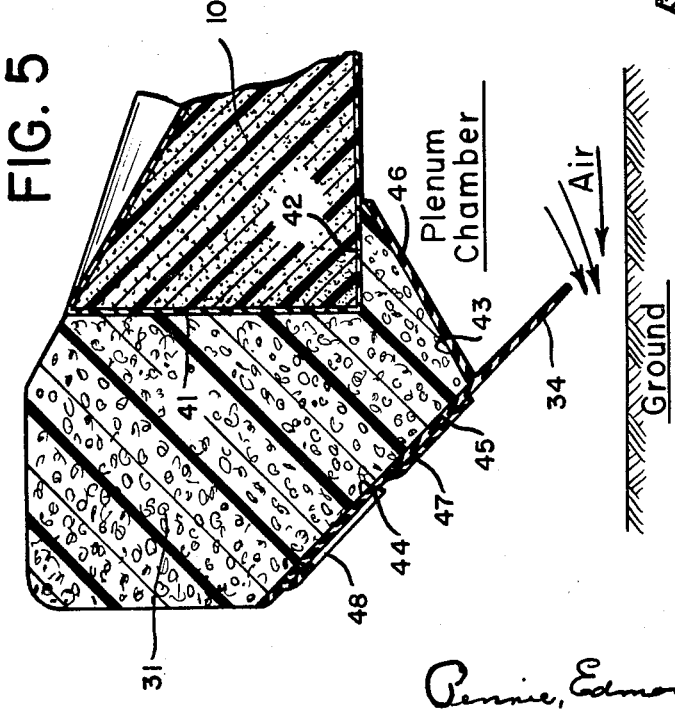

PATENTED JAN 9 1973

INVENTOR
Hugo S. Ferguson
BY
Pennie, Edmonds, Morton, Taylor + Adams
ATTORNEYS

AIR CUSHION VEHICLE

RELATED APPLICATION

This application is a continuation-in-part of application Ser. No. 2,810 filed Jan. 14, 1970, now U.S. Pat. No. 3,608,662 by Hugo S. Ferguson for "Air Cushion Vehicle."

BACKGROUND OF THE INVENTION

This invention relates to air-cushion vehicles and especially to relatively small vehicles capable of carrying one or two persons, although the features of the invention may be employed on larger vehicles if desired.

The invention is particularly directed to a body platform and skirt construction of the plenum chamber type which is simple, rugged, and provides protection for both vehicle and operator under a wide variety of conditions encountered in practice, yet is relatively inexpensive.

In application Ser. No. 2,810 a small air-cushion vehicle is described which is highly maneuverable and capable of fairly high speeds over water, ground, snow, ice, etc. For example, speeds of forty miles an hour and above have been attained. Such vehicles should be very rugged in order to withstand shocks encountered in traveling over rough terrain, in passing from water to ground or ice and vice versa, and to withstand accidental collisions with solid objects or other vehicles. Also, shocks should be absorbed insofar as possible to avoid serious injury to the rider.

The vehicle described in the aforesaid application employs an open-bottom plenum chamber for producing the supporting air cushion, the plenum chamber being formed by the bottom of the body platform and a downwardly extending wall around the periphery of the vehicle. These portions of the vehicle are particularly subject to damage in passing over rough terrain, etc., and in any event the wall is subject to considerable wear.

The present invention utilizes certain features of the vehicle described in the aforesaid application, with added features which improve the ability of the vehicle to meet a wide variety of operating conditions without undue wear or damage.

SUMMARY OF THE INVENTION

In accordance with the invention, the air-cushion vehicle has a body structure including a rigid platform, and a shock absorber section of semi-rigid self-supporting resilient material is fixedly attached to the rigid platform around at least a major portion of the periphery thereof, and preferably around the entire periphery, the shock absorber section extending outwardly from the rigid platform. A thin skirt of tough flexible material is united with the shock absorber section and extends downwardly from the peripheral region thereof.

Advantageously the lower surface of the shock absorber section extends outwardly and downwardly substantially below the rigid platform, and the shock absorber section on the sides of the vehicle extends beneath the rigid platform in overlapping relationship for a substantial portion of the width of the section with the overlapping surfaces joined together. The overlapping relationship is desirable at the rear and front also. Further, advantageously the thin tough flexible skirt has integral mounting sheet members united respectively with the outer peripheral surface and the lower surface of the shock absorber section.

Preferably the overlapping surfaces of the rigid platform and the shock absorber section at the sides and rear of the vehicle are inclined outwardly and upwardly from the horizontal, and the same relationship may be employed at the front of the vehicle. Also, preferably, the flexible skirt extends downwardly and inwardly along at least the front and sides of the vehicle, and the lower portion of the outer peripheral surface of the shock absorber section at the front of the vehicle slopes upwardly and forwardly.

The rigid platform, shock absorber section and skirt comprise a plenum chamber, and air pressure is supplied to the plenum chamber to produce an air cushion for the vehicle.

With the preferred construction the shock absorber section functions effectively in both horizontal and vertical directions. As a horizontal shock absorber, it absorbs lateral blows from any direction, thereby protecting the vehicle and rider from collisions. As a vertical shock absorber, it absorbs shocks encountered in passing over obstacles. Small obstacles may only bend portions of the flexible skirt, and the inward tilt of the skirt at the front and sides promotes bending without injury to the skirt and also reduces skirt wear. Larger obstacles may compress or deflect the shock absorber section. At the front, due to the upward slope of the lower leading surface, much of the shock may be absorbed by compression. However, on the sides and rear the outwardly-extending shock absorber section can bend upwardly to absorb the shock. The vertical shock absorber action also cushions the vehicle in making transitions from horizontal to inclined surfaces, as in traveling from a lake up an inclined bank.

The mounting sheet members integral with the skirt provide a secure union of the skirt with the shock absorber section, capable of withstanding both inward and outward forces on the skirt as well as vertical forces, and also protect the periphery and lower surface of the shock absorber section against abrasion and cuts.

The downward slope of the shock absorber section increases the height of the inner rigid platform from the supporting surface, thereby reducing the possibility of injury to the rigid platform. Also, the overlapping portion of the shock absorber section protects the rigid platform, especially when the shock absorber section bends in passing over obstacles. In addition, the outward and upward slope of the overlapping surfaces assists the shock absorber section to absorb blows without being torn off.

Preferably the rigid platform is formed primarily of a foamed closed-cell rigid plastic and the shock absorber section is formed primarily of a foamed closed-cell semi-rigid resilient plastic. Such a structure provides ample buoyancy, and also absorbs engine vibration without requiring special shock mountings. Specific materials for the rigid and semi-rigid portions of the structure, as well as for the skirt, are described hereinafter.

The vehicle has excellent stability since the shock absorber section, which forms part of the plenum chamber, cannot collapse. The downward slope of the bottom of the shock absorber section aids stability by limiting tilting and rolling on solid terrain. This is also true when traveling over water, since the section is advantageously formed of light buoyant material and, upon entering the water, creates a restoring force which reduces the possibility of overturning.

Accordingly a combination of many desirable attributes are obtained in a simple structure which is relatively inexpensive. Other features and advantages will in part be pointed out and in part be apparent from the following description of a specific embodiment.

BRIEF DESCRIPTION OF THE DRAWINGS

FIG. 1 is a perspective view of an air-cushion vehicle employing features of the invention;

FIG. 2 is a longitudinal cross-section of the vehicle of FIG. 1;

FIG. 3 is a bottom view of the vehicle;

FIG. 4 is a lateral cross-section along the line 4-4 of FIG. 2;

FIGS. 5-7 are cross-sections showing details of platform, shock absorber and skirt structure at the front, side and rear of the vehicle, respectively;

DESCRIPTION OF THE SPECIFIC EMBODIMENTS

Figure 8:
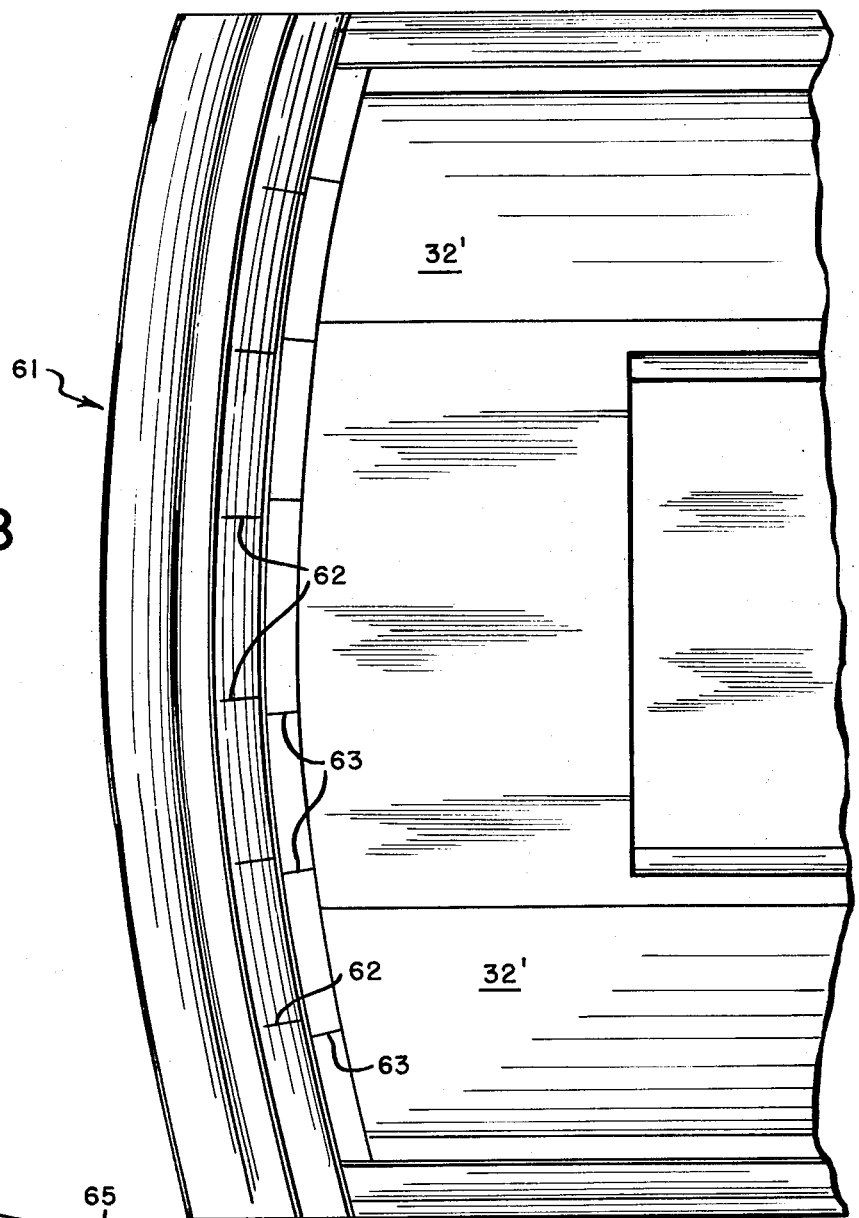
FIG. 8 is a bottom view of a modification of the front of the vehicle.

Referring to FIGS. 1-4, a vehicle similar to that of application Ser. No. 2,810 is shown. A body structure including a rigid platform 10 has mounted thereon an air propeller 11 driven by engine 12. A shroud 13 encircles the propeller to improve its efficiency. Front steering vanes 14 are mounted for rotation about vertical axes to direct the downstream flow of air from the propeller to lateral angles on either side of the vehicle. Upwardly-extending rear steering vanes 15 are mounted on each side of the vehicle. Air channels are mounted on the body platform 10 between the front and rear steering vanes and receive portions of the downstream flow of air under the control of the front steering vanes and direct the air flow therethrough to the rear steering vanes. The port air channel is indicated by arrow 16.

These portions of the vehicle and their operation are described in detail in the aforesaid application, to which reference is made for further details. Here it suffices to say that the arrangement provides two point steering which yields a highly maneuverable vehicle capable of excellent performance.

Also mounted on the body platform are a seat 17 containing a gas tank, a compartment 18 for auxiliaries, etc. which need not be here described. Braces 19 strength the vehicle and serve as guards for the driver.

The body platform 10 has a slot-like opening 21 which supplies air under pressure from the lower portion of the propeller 11 to the plenum chamber 22 beneath the vehicle, thereby creating an air cushion which supports the vehicle during operation. Fixed curved vanes 23 direct a portion of the air to the forward part of the plenum chamber 22 so as to equalize the air pressure in various parts of the chamber. Mufflers 24 are attached beneath the inclined floor portion 25 of the platform 10, so as to exhaust into the plenum chamber and reduce noise.

In accordance with the invention, a shock absorber section 31, 32, 33 of semi-rigid self-supporting resilient material is fixedly attached to the rigid body platform around the periphery thereof, and extends outwardly therefrom. A thin skirt 34, 35, 36 of tough flexible material is united with the shock absorber section and extends downwardly from the peripheral region thereof. Details of the construction are shown in FIGS. 5-7.

Referring to FIG. 5, a cross-section of the structure at the front of the vehicle is shown. The resilient semi-rigid shock absorber section 31 is attached to the peripheral surface 41 of the rigid body platform 10, and also to the bottom surface 42 thereof, as by contact cement or other strong adhesive. This portion 31 of the shock absorber section is relatively massive since the front of the vehicle commonly is subject to more frequent and harder blows than the sides and rear. Also the buoyancy assists in preventing the vehicle from "plowing-in" when traveling over water.

The lower surface 43 slopes downwardly and outwardly. The lower portion 44 of the outer peripheral surface slopes upwardly and forwardly. This provides a planing surface when the vehicle is traveling on water, and also enables the section 31 to compress in both vertical and horizontal directions to absorb shocks when passing over obstacles. An angle of about 45° has been found satisfactory, but other angles lying generally midway between horizontal and vertical angles may be employed if desired.

The downwardly-extending skirt section 34 is inclined inwardly or rearwardly so as to enable it to bend readily in passing over obstacles, and to assist in raising the front of the vehicle when starting off in water. Integrally formed with skirt 34 are mounting sheet members 45 and 46 which are united respectively with the outer peripheral surface and the lower surface of the shock absorber section 31, as by contact cement or other suitable means. Sections 45 and 46 not only provide a strong attachment of the skirt, but also protect the adjacent surfaces of the shock absorber section from abrasion and cutting.

Sheet member 45 could be sufficiently wide to cover the entire height of the inclined outer peripheral surface 44 of the shock absorber section. However, in this embodiment skirt lengths having the same cross-section are used for front, sides and rear of the vehicle, and sheet member 45 extends only part way up surface 44. Accordingly, additional strips 47 and 48 of the same material are attached in overlapping relationship so as to protect the entire surface 44 and also to protect the upper edge of sheet member 45 from being snagged and torn away.

The skirt 34 and integral sheet members 45, 46 could be formed to fit the curvature of the front of the vehicle. In this embodiment, however, a straight length is cut into individual short lengths and attached to the vehicle in overlapping relationship as shown in FIG. 3. Thus members 45 of adjacent short lengths are attached in overlapping relationship, and similarly for members 46. The downwardly-extending skirt portions 34 of adjacent lengths also overlap slightly, but are left free so that they can individually flex to pass over obstacles.

After attaching the individual skirt lengths, strips 47,47' and 48,48' are attached thereover. Four strips are here used, two on each half of the rounded bow, and shaped to enable flat sheet material to be employed. The four strips actually overlap at the center, as indicated in FIG. 3, but this is not shown in FIG. 5 since most of the bow is covered by only two strips.

Referring to FIG. 6, the construction on the sides of the vehicle is shown. Here the shock absorber section 32 extends beneath the rigid platform 10 in overlapping relationship, and the overlapping surfaces at 51 are joined together, as by contact cement. Advantageously the overlapping surfaces at 51 are inclined outwardly and upwardly from the horizontal, so as to provide a strong joint which resists inward horizontal impacts. An angle of about 15° to the horizontal has been employed with success. This, together with an approximately 10° tilt of the lower surface of section 32, yields a total included angle of about 25° at the apex of section 32. The overlap at 51 is a substantial portion of the width of the shock absorber section and protects the rigid platform when the section bends upward in riding over an object, as indicated in dotted lines.

The tough flexible skirt 35 is united with the shock absorber section 32 by the integral mounting sheet members 52 and 53, extending upwardly along the outer peripheral surface and inwardly along the lower surface of section 32, respectively. These provide both secure attachment and protection for the shock absorber section.

Referring to FIG. 7, the construction at the rear of the vehicle is illustrated. It is similar to FIG. 6 and need not be described in further detail. To reinforce the joint between the rigid platform 10 and shock absorber section 32, and also to protect the under surface of the latter, a sheet 54 of the same tough material as the skirt is cemented over the joint. As shown in FIG. 3, skirts 55, 55' are cemented over the junctions of the side and rear portions of the shock absorber section for added protection.

The downward extent of skirt 36 at the rear is less than that of skirt sections 34 and 35 at the front and sides of the vehicle, about one inch shorter in the embodiment shown. This reduces the danger of tearing the skirt off when passing over obstacles, reduces the drag on the vehicle when traveling over rough water, and increases the speed somewhat due to increased escape of air from the air cushion at the rear of the vehicle.

At the sides and rear the outer surface of the shock absorber section, covered by the attached skirt mounting sheet member, is inclined upwardly and outwardly to provide planing surfaces which reduce any tendency of the vehicle to dig into the water when executing maneuvers involving side or rear movement. Small angles of say 10° from the vertical are here employed.

The flexible skirt sections 35 at the sides of the vehicle may be continuous from front to rear of the vehicle, and are advantageously curved or sloped inwards. This reduces wear at lower edge, since the lower portion can readily bend inwards upon contact with an obstacle. The skirt may be tapered so that the lower edge is thinner, thereby allowing the lower portion to bend more easily and reducing wear. The rear skirt section 36 is also continuous from end to end. The rear ends of the side skirt sections 35 abut the adjacent ends of the rear skirt section 36, but are not attached thereto so as to allow each to flex as required without tearing at the corners. Similarly the outer ends of the front skirt sections 34 overlap the front ends of the side skirt sections but are not attached thereto.

Figure 9:
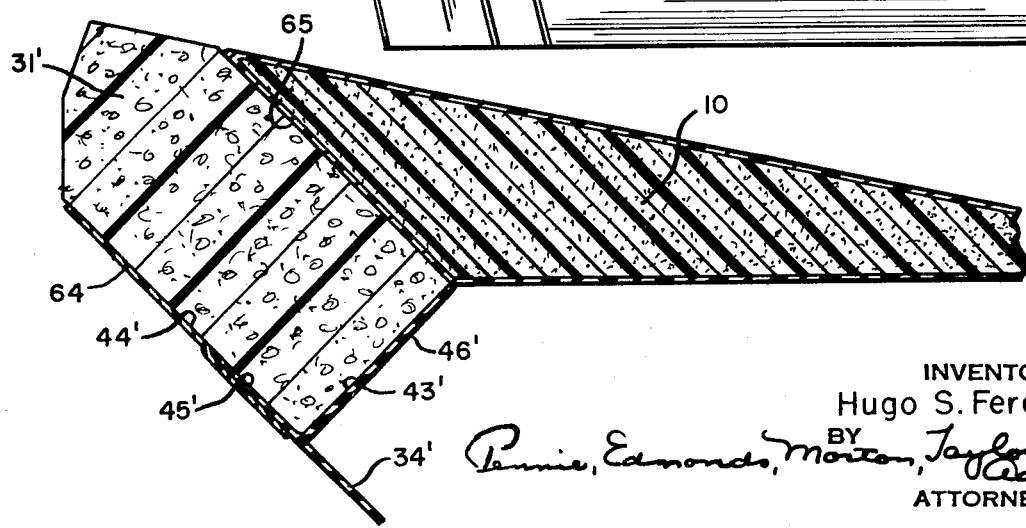
FIG. 9 is a cross-section showing details of the modification of FIG. 8.

Referring to FIGS. 8 and 9, a modification of the front of the vehicle is shown. Here the bow section 61 as seen in FIG. 8 is an arc of a circle of large radius. The resulting increase in square footage under the bow increases the lift from the air cushion so that a somewhat superior performance on rough ground is obtained. Further, the smaller curvature enables a simpler skirt construction to be employed.

Here a single length of skirt material extends across the entire bow. The peripheral mounting sheet member 45' is continuous from end to end and cemented to the inclined surface 44' of the shock absorber section 31'. The downwardly-extending skirt 34' and the inwardly-extending mounting sheet member 46' are slit at staggered intervals, as shown at 62 and 63 in FIG. 8. This enables an initially straight length of skirt material to be bent sufficiently to conform to the curved bow, and the slit sections of sheet member 46' are attached to the inclined surface 43' of the shock absorber section. The slits in skirt 34' also allow the slit sections to flex independently in passing over obstacles.

An additional protecting sheet 64 of the same material as the skirt is cemented over the entire inclined peripheral surface 44' of the bow section, and overlaps skirt member 45', for added protection.

The shock absorber section 31' extends beneath the rigid platform 10 in overlapping relationship and is cemented thereto. The overlapping surfaces, indicated at 65, incline upwardly and outwardly from the horizontal similar to the side and rear constructions of FIGS. 6 and 7 so that horizontal and vertical components of a blow tend to compress the shock absorber section 31' against the rigid platform 10, thereby enabling the blow to be absorbed without undue stress on the joint at the overlapping surfaces. An angle of about 45° is here shown.

Various materials may be employed for different parts of the structure as desired. The following identifies materials used in the specific embodiment shown.

The rigid body platform 10 is molded of foamed, closed-cell rigid polyurethane with a tough skin produced by maintaining the mold at a suitable temperature to form the desired skin thickness, in accordance with considerations known in the art. A so-called 2 lbs/cu. ft. "system" using freon as the foaming agent has been employed with success, yielding a density of around 4 lbs./cu. ft. in the core and around 30 lbs./cu. ft. in the skin. For added strength, fiber glass may be incorporated in the material or the exposed surfaces covered with fiber glass.

The peripheral shock absorber section 31-33 is of foamed semi-rigid polyethylene having a substantially closed-cell structure, say 90 percent or more closed cells. A Dow Chemical Company product sold under the brand name ETHAFOAM 220 has been used with success. This has a density of about 2.2 lbs./cu. ft. The material may be considered to be a solid as distinguished from liquid or gas, despite its foamed composition and resiliency, and is self-supporting and of considerable strength.

The shock absorber section is conveniently fabricated from slabs adhered by heat, cut as required, and then cemented to the body platform. With closed-cell semi-rigid material, the resistance to compression increases at a rate greater than unity, at higher pressures, as compared to an approximately linear relationship obtained with open-cell material, and hence is capable of absorbing heavy shocks without undue deformation. For example, ETHAFOAM 220 compresses about 25 percent at 6 psi and about 50 percent at 15 psi. Also, the closed-cell material does not absorb water to a significant degree.

The skirt material is ethylene vinyl acetate (EVA) having a density of about 0.95 and a Shore A Durometer hardness of about 90–95. This material is very tough while still being flexible, and is resistant to tearing. The several skirt sections may be cut from lengths having the same generally T-shaped cross-section, if desired. Thus in one embodiment, on the sides as seen in FIG. 6, the width of the curved skirt 35 was slightly under 3 inches and skirt mounting members 52 and 53 were about 3¾ inches and 6 inches, respectively. The shirt 36 at the rear was cut down about an inch. At the front (FIG. 5) the skirt section was inverted so that mounting and skirt members 52, 35 on the side became skirt and mounting members 34, 45. The members were about three-sixteenths inch thick near their bases and tapered to smaller dimensions at the free edges thereof.

Preferably the skirt is strong enough to withstand normal air cushion pressure without substantial deformation. This is approximately one-tenth pound per square inch in the embodiment shown, and skirt members as described have been found to be sufficiently rigid to maintain their configuration in normal traveling and yet bend readily when contacting an obstacle.

Although these materials are preferred at the present time, alternative materials such as fiber glass or ABS (acrylonitrile-butadiene-styrene copolymer) could be used for the rigid platform, and reliance placed on the shock absorber section for buoyancy. For the skirt, possible alternatives to EVA include black polyurethane and neoprene rubber.

As described, the skirt is separately formed and then attached to the shock absorber section to form a unitary structure. If suitable materials become available, it may be possible to form the skirt and mounting sheet members integrally with the shock absorber section, for example in a manner analogous to the formation of the tough skin on the rigid platform.

The vehicle specifically shown in FIGS. 1–7 is about 10 feet long and 5½ feet wide. In FIG. 6 (side) the rigid platform 10 is about 3½ inches thick inside the overlapping region and the shock absorber section 32 about 4 inches thick outside the overlapping region. The shock absorber section extends about 7¾ inches beyond the rigid platform at the top and its width at the bottom is about 16¼ inches. In FIG. 7 (rear) the thicknesses are similar, the shock absorber section 33 extends about 6 inches beyond the rigid platform at the top, and its width at the bottom is about 12 inches. At the front the structure is larger, as is evident. These dimensions are given for illustrative purposes only, and it will be understood that the invention is not confined thereto.

In operation, the vehicle may move in any direction, including rearwards when turning the vehicle around to stop. The shock absorber section absorbs lateral shocks from any direction. In passing over small obstacles such as rocks, the skirt sections may bend as required, without tearing or undue wear. For larger obstacles the shock absorber section at the front can compress to absorb the shock as the vehicle passes thereover, and the shock absorber section at the sides and rear may bend upwards to absorb the shock. The skirt mounting sheet members protect the shock absorber section on the periphery and bottom against abrasion and cutting, and the overlapping regions of the shock absorber section and rigid platform protect the latter. Also the downward sloping lower surfaces of the shock absorber section maintain the rigid platform farther off the supporting surface so that, with normal caution on the part of the driver, the rigid platform will not be damaged. At the same time, the lower peripheral regions of the shock absorber section aid vehicle stability.

The rigid platform, shock absorber section and skirt form a plenum chamber to which air pressure is supplied, thereby producing an air cushion for the vehicle. It will be noted that the area of the shock absorber section is a substantial portion of the total supporting surface of the plenum chamber, so that the above advantages are obtained while at the same time preserving the lifting area.

The invention has been described in connection with a specific embodiment showing the presently preferred construction. It will be understood that changes may be made therein within the spirit and scope of the invention, and that selected features may be employed and others omitted as meets the judgment of the designer.

I claim:

1. An air-cushion vehicle which comprises
   a. a body structure including a rigid platform,
   b. a shock absorber section of semi-rigid self-supporting resilient material fixedly attached to said rigid platform around at least a major portion of the periphery thereof and extending outwardly therefrom with the lower surface of the shock absorber section extending outwardly and downwardly substantially below the rigid platform,
   c. said shock absorber section on the sides of the vehicle extending beneath said rigid platform in overlapping relationship for a substantial portion of the width of the section with the overlapping surfaces joined together,
   d. a thin skirt of tough flexible material united with said shock absorber section and extending downwardly from the peripheral region thereof,
   e. said rigid platform, shock absorber section and skirt comprising a plenum chamber,
   f. and means for supplying air pressure to said plenum chamber to produce an air cushion for the vehicle.

2. An air-cushion vehicle according to claim 1 in which said overlapping surfaces of the rigid platform and shock absorber section at the sides of the vehicle are inclined outwardly and upwardly from the horizontal.

3. An air-cushion vehicle according to claim 1 in which said thin skirt has mounting sheet members integral therewith which are united respectively with the outer peripheral surface and the lower surface of said shock absorber section.

4. An air-cushion vehicle which comprises
   a. a body structure including a rigid platform,
   b. a shock absorber section primarily of a foamed semi-rigid resilient plastic fixedly attached to said rigid platform around at least a major portion of the periphery thereof and extending outwardly therefrom with the lower surface of the shock absorber section extending outwardly and downwardly substantially below the rigid platform,
   c. said shock absorber section on the sides and rear of the vehicle extending beneath said rigid platform in overlapping relationship for a substantial portion of the width of the section with the overlapping surfaces joined together,
   d. a thin skirt of tough flexible material extending downwardly from the peripheral region of said shock absorber section and having mounting sheet members integral therewith which are united respectively with the outer peripheral surface and the lower surface of the shock absorber section,
   e. said rigid platform, shock absorber section and skirt comprising a plenum chamber,
   f. and means for supplying air pressure to said plenum chamber to produce an air cushion for the vehicle.

5. An air-cushion vehicle according to claim 4 in which said overlapping surfaces of the rigid platform and shock absorber section at the sides and rear of the vehicle are inclined outwardly and upwardly from the horizontal.

6. An air-cushion vehicle according to claim 4 in which said foamed semi-rigid resilient plastic is of the closed-cell type.

7. An air-cushion vehicle according to claim 4 in which said skirt at the front and sides of the vehicle extends downwardly and inwardly.

8. An air-cushion vehicle according to claim 4 in which at least the lower portion of the outer peripheral surface of said shock absorber section at the front of the vehicle slopes upwardly and forwardly generally midway between horizontal and vertical angles, and said skirt at the front of the vehicle extends downwardly and inwardly.

9. An air-cushion vehicle which comprises
   a. a body structure including a rigid platform,
   b. a shock absorber section of semi-rigid self-supporting resilient material fixedly attached to said rigid platform around at least a major portion of the periphery thereof and extending outwardly therefrom,
   c. a thin skirt of tough flexible material extending downwardly from the peripheral region of said shock absorber section and having mounting sheet members integral therewith which are united respectively with the outer peripheral surface and the lower surface of the shock absorber section,
   d. said rigid platform, shock absorber section and skirt comprising a plenum chamber,
   e. and means for supplying air pressure to said plenum chamber to produce an air cushion for the vehicle.

10. An air-cushion vehicle which comprises
    a. a body structure including a rigid platform,
    b. said rigid platform being formed primarily of a foamed closed-cell rigid plastic with a tough adherent skin,
    c. a shock absorber section primarily of a foamed closed-cell semi-rigid resilient plastic fixedly attached to said rigid platform around substantially the entire periphery thereof and extending outwardly therefrom with the lower surface of the shock absorber section sloping downwardly and outwardly substantially below the rigid platform,
    d. said shock absorber section on the sides and rear of the vehicle extending beneath said rigid platform in overlapping relationship for a substantial portion of the width of the section with the overlapping surfaces joined together,
    e. at least the lower portion of the outer peripheral surface of said shock absorber section at the front of the vehicle sloping upwardly and forwardly generally midway between horizontal and vertical angles,
    f. a thin skirt of tough flexible material extending downwardly from the peripheral region of said shock absorber section and having mounting sheet members integral therewith which are united respectively with the outer peripheral surface and the lower surface of the shock absorber section,
    g. said skirt at the front and sides of the vehicle extending downwardly and inwardly,
    h. said rigid platform, shock absorber section and skirt comprising a plenum chamber,
    i. and means for supplying air pressure to said plenum chamber to produce an air cushion for the vehicle.

11. An air-cushion vehicle according to claim 10 in which said overlapping surfaces of the rigid platform and shock absorber section at the sides and rear of the vehicle are inclined outwardly and upwardly from the horizontal.

12. An air-cushion vehicle according to claim 11 in which said shock absorber section at the front of the vehicle extends beneath said rigid platform in overlapping relationship for a substantial portion of the width of the section with the overlapping surfaces inclined forwardly and upwardly from the horizontal and joined together.

13. An air-cushion vehicle according to claim 10 in which the lower edge of the skirt at the rear of the vehicle is substantially above the adjacent lower edges of the skirt on the sides of the vehicle.

14. An air-cushion vehicle according to claim 12 in which said rigid plastic is polyurethane, said semi-rigid plastic is polyethylene and said skirt is ethylene vinyl acetate.

* * * * *